United States Patent [19]

Potter

[11] 4,312,085
[45] Jan. 26, 1982

[54] SANITARY WASTE DISPOSAL PACKETS

[76] Inventor: Bronson M. Potter, R.F.D. 1, Mason, N.H. 03048

[21] Appl. No.: 113,245

[22] Filed: Jan. 18, 1980

[51] Int. Cl.$^3$ .............................................. A47K 17/00
[52] U.S. Cl. ......................................... 4/661; 4/451; 4/476; 4/484; 4/144.2
[58] Field of Search ............... 4/451, 452, 144.2, 484, 4/476, 471, 661, 457, 6

[56] References Cited

U.S. PATENT DOCUMENTS

| | | | |
|---|---|---|---|
| 2,067,958 | 1/1937 | Wallace | 4/484 |
| 2,315,390 | 3/1943 | Billeb | 4/484 |
| 3,381,315 | 5/1968 | Glassberg | 4/484 |
| 3,422,985 | 1/1969 | Rinehart | 4/484 |
| 3,475,767 | 11/1969 | Friesen et al. | 4/452 |
| 3,546,716 | 12/1970 | Laumann | 4/452 |
| 3,591,870 | 7/1971 | Friesen | 4/144.2 |
| 3,654,064 | 4/1972 | Laumann | 4/451 X |
| 3,763,502 | 10/1973 | Laumann | 4/452 |

*Primary Examiner*—Henry K. Artis

[57] ABSTRACT

Mass producible, compact packets disposed in a moisture impermeable container adapted to store and dispense the packets for use in receiving and disposing of solid human waste in a sanitary manner in disaster areas or under other conditions in which normal sanitation facilities are unavailable; the exterior of the packet is a water impermeable outer wrapper systematically closed upon itself and adapted to be used to contain solid waste; the wrapper possesses substantial tensile strength and burst resistance when wet, and in its open laid-flat state is about one foot or longer in each direction, sized to receive all solid waste from a person discharging waste from a squatting position; a portion of toilet tissue is disposed within the packet in a position protected by the outer wrapper; and the packet includes closure means retaining the outer wrapper in its compact form, protecting the toilet tissue prior to use, and adapted, after the outer wrapper has received the waste and has been closed upon itself in a wrapped compact configuration about the waste, to retain the used wrapper and contents in the compact used configuration.

14 Claims, 14 Drawing Figures

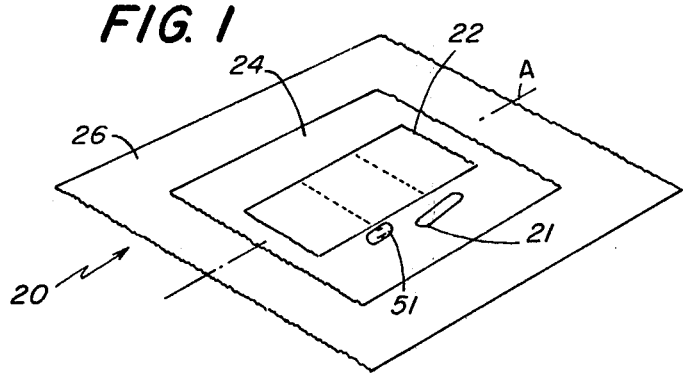
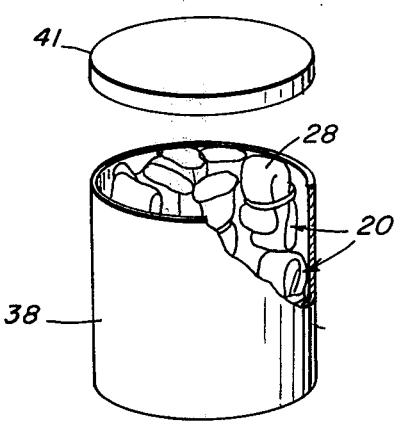
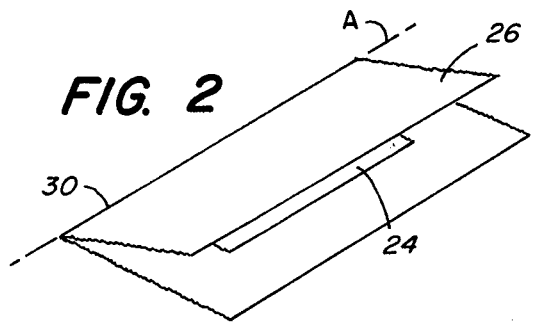
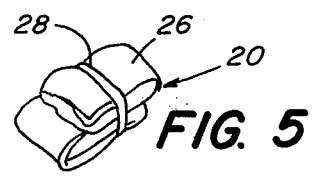
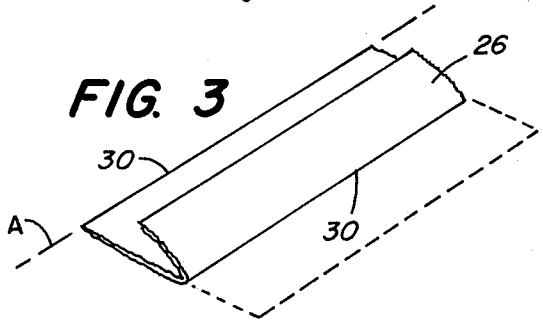
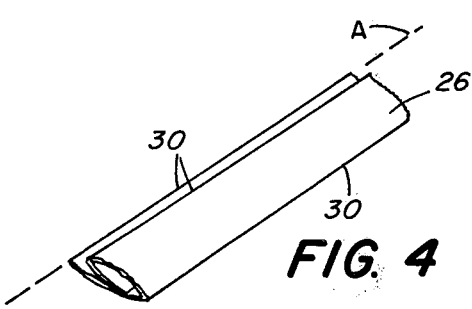
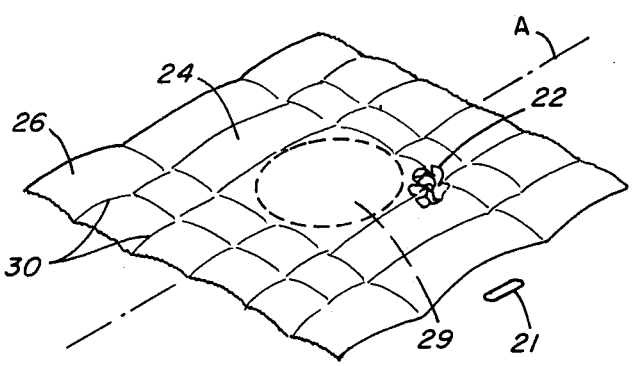
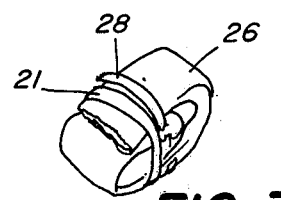
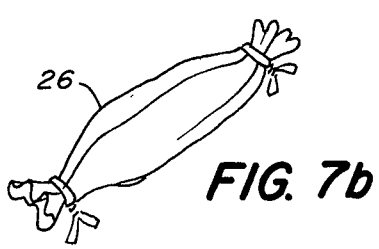

SANITARY WASTE DISPOSAL PACKETS

BACKGROUND OF THE INVENTION

This invention relates to means for disposal of human waste in locations or situations where normal sanitation facilities are unavailable—e.g., in wilderness areas, in flooded deltas, in earthquake areas or sites of other natural disasters. In such situations, water potability, public health, and human comfort demand an efficient, sanitary, inexpensive, and portable means of waste disposal. Systems such as a collapsible cardboard commode (Arndt, Jr. U.S. Pat. No. 3,159,848) are not suitable for large numbers of persons (e.g. in a disaster situation) or for very remote locations.

SUMMARY OF THE INVENTION

In one embodiment, the invention features a mass-producible, compact packet for use in receiving and disposing of solid human waste in a sanitary manner in disaster areas or under other conditions in which normal sanitation facilities are unavailable; the exterior of the packet is a water impermeable outer wrapper systematically closed upon itself and adapted to be used to contain solid waste; the wrapper possesses substantial tensile strength and burst resistance when wet, and in its open laid-flat state is about one foot or longer in each direction, sized to receive all solid waste from a person discharging waste from a squatting position; a portion of toilet tissue is disposed within the packet in a position protected by the outer wrapper; and the packet includes closure means retaining the outer wrapper in its compact form, protecting the toilet tissue prior to use, and adapted, after the outer wrapper has received the waste and has been closed upon itself in a wrapped compact configuration about the waste, to retain the used wrapper and contents in the compact used configuration.

In another embodiment, the invention features a plurality of the above-described user packets disposed in a moisture impermeable container, which is adapted to store and dispense the packets.

In preferred embodiments, the container has a reusable closure, and, after removal of the packets, is adapted to receive urine and store it for disposal; an absorbent layer is disposed in contact with an interior surface of the wrapper, protected by the outer layer when the outer layer is closed upon itself before or after use, the absorbent layer being disposed, when the outer layer is open for use, to receive and absorb and hold moist human waste; the wrapper is air permeable to admit air to the contained waste in quantities to promote aerobic bacterial decomposition of the solid waste; the outer layer is biodegradable in the presence of moisture at the end of a degradation period substantially exceeding the normal decomposition period for human waste; the packet includes a first closure that securely retains it in closed condition before use, and a visually distinguishable second closure adapted for retaining the used wrapper and contents in the compact, used configuration, the wrapper being capable of being unwrapped only after breaking of the first closure means; the first closure is a string connected also to a second such packet, and a second such string closing the second packet is connected also to a third packet; the wrapper is generally rectangular and has at least three creases parallel to a centrally located longitudinal axis, and at least two creases perpendicular to that axis, the creases being adapted to suggest to the user to contain the waste in the wrapper by first turning the wrapper over on itself along the axis and then folding along the creases perpendicular to the axis, the creases perpendicular to the axis being located to define an area therebetween greater than one-half the size of the wrapper so that the waste is easily contained in that area by the turning and folding; and limestone is included in the packet for use on the waste; methods of disposal of solid human waste include wrapping the waste within the wrapper by turning the wrapper over on itself to form a roll and closing the ends of the roll, thereafter securing closure means in a manner preventing escape of the waste and decomposing the waste by allowing the wrapper to remain in open air contact; the used packet can be collected with used packets from other users and carried to a site for burning.

DESCRIPTION OF THE PREFERRED EMBODIMENTS

We turn now to the preferred embodiments of the invention, first briefly describing the drawings thereof.

DRAWINGS

FIG. 1 is an unwrapped packet.

FIGS. 2–5 show wrapping of packet for storage.

FIGS. 6, 7a and 7b show alternate wrapping of packet after use.

FIG. 8 shows a container for dispensing unused packets wrapped as in FIG. 5.

STRUCTURE AND USE

Figure 9:
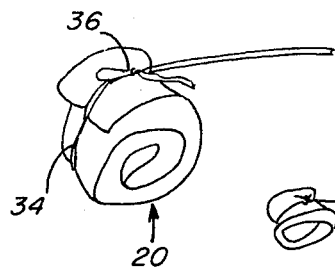
FIGS. 9 and 10 show an alternate wrapping configuration for storage.

Referring first to FIGS. 1–5, packet 20 is prepared by placing rubber band 21, toilet tissue 22, and blotter paper 24 in the center of paper sheet 26. Paper sheet 26 is sized to receive all solid waste from a person discharging waste from a squatting position—e.g. at least one foot square; the paper has substantial wet strength and is impermeable to water. Sheet 26 is folded on its longitudinal axis A (FIG. 2) and rolled from the open ends toward the axis (FIG. 3). The ends of the rolled packet are then folded toward the center in a Z fold (FIG. 5) and secured with adhesive tape 28. A number of such compact packets are stored in liquid-tight cannister 38 (FIG. 8). The cannister has a reclosable snap top 41 and, after the packets are dispensed, the empty cannister can be used to contain and store and dispose of urine.

For use, the tape around the packet must be broken, and the rolling steps are reversed to unfold the packet. Paper 26 has creases 30 which indicate to the user that solid waste 28 and used toilet tissue 22 are wrapped as in the steps of FIGS. 1–5, and closed with rubber band 22. The used wrapped packet can be returned to the cannister for disposal. Rubber band 22 is distinguishable both in color and substance from tape 28, and, once broken, tape 28 cannot be used to reclose the packet, thus avoiding any possibility of confusion between used and unused packets.

Figure 10:
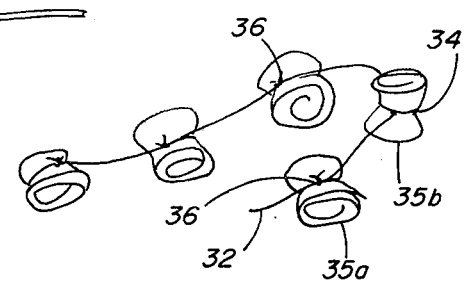
Figure 11:
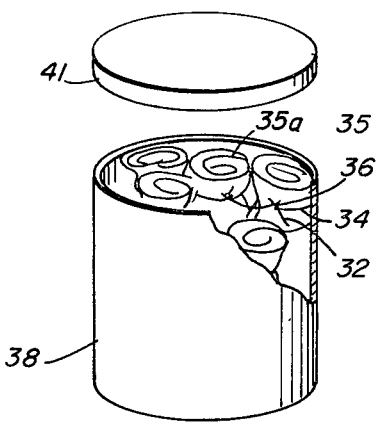
FIG. 11 shows a container for dispensing packets wrapped in FIG. 10.
Figure 12:
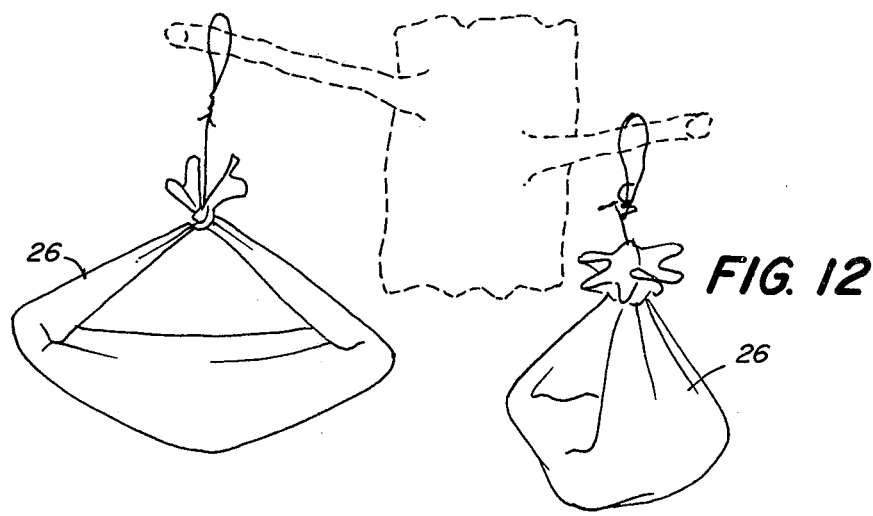
FIG. 12 shows a method of disposal.

In alternate embodiments, the packet of FIG. 9 is prepared by rolling the folded packet of FIG. 4 from one end and securing the rolled packet with string 32. In FIG. 10 several such packets are conveniently connected in that closure 34 for one packet 35 is fixed around a second packet 35a by slipnot 36 and a second string 39 around packet 35a connects it to the next packet 35b. Thus, a single packet can be easily uncoupled from the string of packets. Unused packets are stored in a liquid tight plastic cannister 38 (FIG. 11) as in the embodiment in FIG. 8 described above.

Alternate means of disposal include folding and rolling the used packet (to the stage depicted in FIG. 4), tying the ends together with string 34, and suspending the packet with string 34 so as to allow air to permeate the packet. A used packet can also be secured using thin paper-covered wire 42 either by securing both ends together with one wire as in FIG. 7a, or by securing both ends independently as in FIG. 7b. (The twistable wires can be of the known type commonly made available with plastic garbage bags.) The used packet is left to decompose on a table or screen 43 as in FIG. 13. In either mode of disposal, the paper promotes decomposition of the waste by aerobic bacteria in that it is permeable to air and provides heat insulation to retain the heat generated by the decomposition and thus accelerate the decomposition process, which ranges from about two months to about a week, depending on weather conditions. Pore size is selected to restrict bacterial flow in wet conditions while permitting some flow of air. The outer paper, as well as the string, (e.g. a twisted paper string), are constructed to be biodegradable in the presence of moisture at the end of a degradation period (e.g., about a year) substantially exceeding the normal decomposition period of human solid waste. Accordingly, used packets will themselves decompose. Alternatively, after decomposition of the waste, packets from numerous users can be collected and burned without unpleasant odor after waste decomposition. They can also be discarded in damp areas (e.g., flooded areas).

Figure 13:
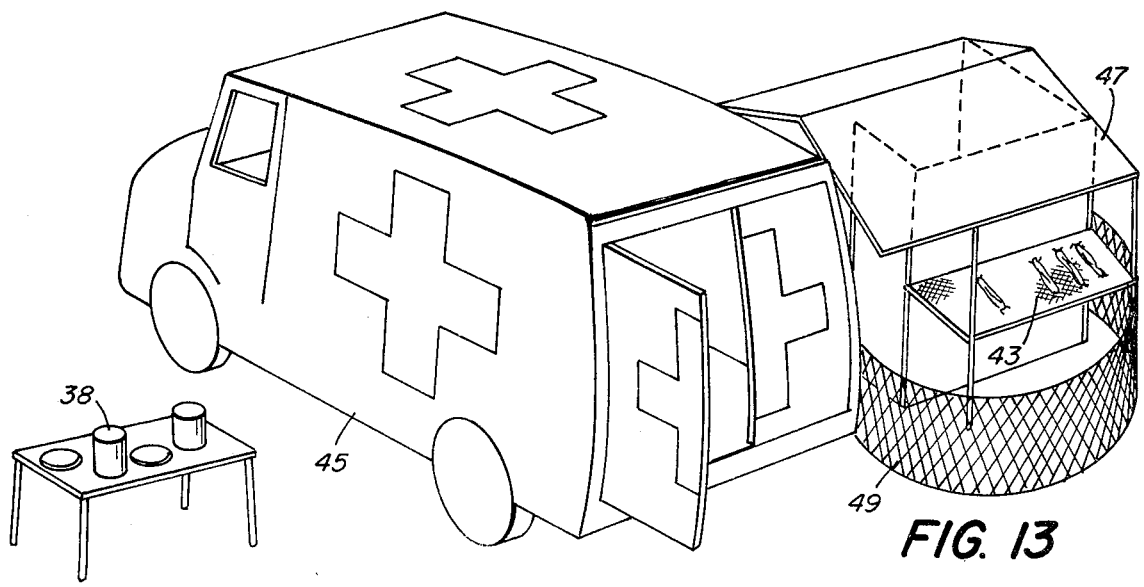
FIG. 13 shows an alternate method of disposal at a disaster site.

FIG. 13 depicts a disaster area, e.g., an earthquake or flood, where normal sanitation facilities are unavailable. Relief truck 45 can be used to transport and dispense needed items including the subject invention. Used packets can be collected at the site on screen 43 for sanitary decomposition and later burning, thus lessening the risk of disease that is present in such situations. Roof 47 is disposed over the screen, and a wire fence 49 prevents access by animals.

OTHER EMBODIMENTS

The outer wrapping paper can include an absorbent inner surface; it can also be newsprint, meat wrapper, or fish paper such as Tonkin Paper Co.'s Sub-Wrap. Limestone can be included in the packet, for example as a tablet 51 to be crumbled and added to solid waste to hasten bacterial decomposition. The packet closure can be a taped paper band which can be placed around a used packet whose ends are tied in the manner of the packet of 7b.

I claim:

1. A mass-producible, compact packet for use in receiving and disposing of solid excrement in a sanitary manner without use of normal sanitation facilities, comprising a water impermeable outer wrapper systematically closed upon itself to form the exterior of said packet, said outer wrapper adapted to be opened and used to receive said excrement and to be closed thereabout, said wrapper possessing substantial tensile strength and burst resistance when wet, and in its open laid-flat state being about one foot or longer in each direction, sized to receive all solid excrement from a person discharging excrement from a squatting position, said wrapper being air permeable to admit air to excrement contained in said wrapper through the wall of said wrapper in quantities to promote aerobic bacterial decomposition of said excrement, a portion of toilet tissue disposed within said packet in a position protected by said outer wrapper, and closure means retaining said outer wrapper in its compact form, protecting said toilet tissue, prior to use and adapted, after said outer wrapper has received said excrement and has been closed upon itself in a wrapped compact configuration about said excrement, to retain said used wrapper and contents in said compact used, excrement-containing configuration whereby, after closure around said excrement, said packet may be placed in a location exposed to air to accelerate sanitary decomposition of said excrement while said excrement remains contained by said wrapper, without harm to the environment.

2. A waste disposal system for receiving and disposing of solid excrement in a sanitary manner without use of normal sanitation facilities, comprising a plurality of user packets disposed in a moisture impermeable container, said container adapted to store and dispense said packets, each said packet comprising a water impermeable outer wrapper systematically closed upon itself to form the exterior of said packet, said outer wrapper adapted to be opened and used to receive said excrement and to be closed thereabout, said wrapper possessing substantial tensile strength and burst resistance when wet, and in its open laid-flat state being about one foot or longer in each direction, sized to receive all solid excrement waste from a bowel movement, said wrapper being air permeable to admit air to excrement confined in said wrapper in quantities to promote aerobic bacterial decomposition of said solid excrement, and closure means retaining said outer wrapper in its compact form, prior to use and adapted, after said outer wrapper has received said excrement and has been closed upon itself in a wrapped compact configuration about said excrement, to retain said used wrapper and contents in said compact used configuration whereby, after closure around said excrement, said packet may be placed in a location exposed to air to accelerate sanitary decomposition of said excrement while said excrement remains contained by said wrapper, without harm to the environment.

3. The waste disposal system of claim 2 wherein said container includes a reusable closure, said container, after removal of said packets, adapted to receive liquid excrement and to store said waste for disposal.

4. The waste disposal product of claim 1 or 2 wherein an absorbent layer is disposed in contact with an interior surface of said wrapper, protected by said outer layer when said outer layer is closed upon itself before or after use, said absorbent layer disposed, when said outer layer is open for use, to receive and absorb and hold moist excrement.

5. The waste disposal product of claim 1 or 2 wherein said outer layer is biodegradable in the presence of moisture at the end of a degradation period substantially exceeding the normal decomposition period for excrement.

6. The waste disposal product of claim 1 or 2 wherein said closure means of said packet includes a first closure that securely retains said packet in closed condition before use, and a second closure adapted for retaining said used wrapper and contents in said compact, used configuration.

7. The waste disposal product of claim 6 wherein said first and second closures are visually distinguishable, said wrapper being capable of being unwrapped only after breaking of said first closure means.

8. The waste disposal product of claim 6 wherein said first closure is adhesive tape.

9. The waste disposal product of claim 6 wherein said first closure includes means for connecting said packet to other such packets.

10. The waste disposal product of claim 9 wherein said first closure is a string connected also to a second such packet, and a second such string closing said second packet and connected also to a third such packet.

11. The waste disposal product of claim 1 or 2 wherein said wrapper is generally rectangular and has at least three creases parallel to a centrally located longitudinal axis, and at least two creases perpendicular to said axis, said creases being adapted to suggest to the user to contain the waste in said wrapper by first turning said wrapper over itself along said axis and then folding along said creases perpendicular to said axis, and said creases perpendicular to said axis being located to define an area therebetween greater than one-half of the size of said wrapper, so that said excrement is easily contained within said area by said turning and folding.

12. The waste disposal product of claim 1 or 2 wherein said wrapper includes a supply of limestone for use on solid excrement.

13. A mass-producible, compact packet for use in receiving and disposing of solid excrement in a sanitary manner, comprising a water impermeable outer wrapper systematically closed upon itself to form the exterior of said packet, said outer wrapper adapted to be opened and used to receive said excrement and to be closed thereabout, said wrapper possessing substantial tensile strength and burst resistance when wet, and in its open laid-flat state being about one foot or longer in each direction, sized to receive the solid excrement of a bowel movement, said wrapper being air permeable to admit air to excrement confined in said wrapper through the wall of said wrapper in quantities to promote aerobic bacterial decomposition of said excrement, closure means retaining said outer wrapper in its compact form prior to use and adapted, after said outer wrapper has received said excrement and has been closed upon itself in a wrapped compact configuration about said excrement, to retain said used wrapper and contents in said compact used, excrement-containing configuration, whereby, after closure around said excrement, said packet may be placed in a location exposed to air to accelerate sanitary decomposition of said excrement while said excrement remains contained by said wrapper, without harm to the environment.

14. The waste disposal product of claim 1, 2 or 13 wherein said outer wrapper retains its water impermeability and burst resistance when wet for a period exceeding the decomposition period of said excrement.

* * * * *